United States Patent [19]

Repin

[11] Patent Number: 4,624,788

[45] Date of Patent: Nov. 25, 1986

[54] METHOD OF BIOLOGICAL PURIFICATION OF WASTE WATER

[76] Inventor: Boris N. Repin, Stremyanny pereulok, 17/21, kv. 58, Moscow, U.S.S.R.

[21] Appl. No.: 683,911

[22] Filed: Dec. 19, 1984

[51] Int. Cl.$^4$ .............................................. C02F 3/12
[52] U.S. Cl. ................................. 210/607; 210/624; 210/625
[58] Field of Search ............... 210/624, 625, 607, 614, 210/626

[56] References Cited

U.S. PATENT DOCUMENTS

| | | | |
|---|---|---|---|
| 2,457,057 | 12/1948 | Mallory | 210/624 |
| 3,386,910 | 6/1968 | Forrest | 210/624 |
| 4,183,808 | 1/1980 | Drnevich | 210/624 X |
| 4,442,005 | 4/1984 | Breider | 210/614 |

FOREIGN PATENT DOCUMENTS

| | | |
|---|---|---|
| 2936884 | 3/1981 | Fed. Rep. of Germany . |
| 3011247 | 10/1981 | Fed. Rep. of Germany . |
| 57-28316 | 6/1982 | Japan . |
| 2034296 | 6/1980 | United Kingdom . |
| 2057415 | 4/1981 | United Kingdom . |
| 2080276 | 2/1982 | United Kingdom . |
| 2084127 | 4/1982 | United Kingdom . |
| 2102784 | 2/1983 | United Kingdom . |
| 2105701 | 3/1983 | United Kingdom . |

Primary Examiner—Tom Wyse
Attorney, Agent, or Firm—Burgess, Ryan & Wayne

[57] ABSTRACT

A method of biological purification of waste water by removing organic contaminants therefrom by activated sludge in two purification stages is proposed. The primary stage involves mixing waste water with activated sludge, aerating the mixture and separating recyclable sludge and sludge water. The recyclable sludge is regenerated and fed for mixing with waste water. At the secondary stage the sludge water of the primary purification stage is aerated and residual activated sludge is removed therefrom. The recyclable sludge delivered for regeneration is divided into two flows one of which is fed directly for regeneration, whereas the other is compacted prior to regeneration to be mixed with the first for joint regeneration. An invariable ratio between the amount of organic contaminants carried by incoming waste water and activated sludge is continuously maintained at the first purification stage. An aeration tank for carrying out the proposed method comprises mixing vessels of the primary and secondary stages. The primary stage includes connected in sequence vessel, sludge separator, and a regeneration chamber connected to the vessel inlet. There is also provided a sludge compactor communicated by an inlet with the sludge separator and by outlets with the regeneration chamber and mixing vessel of the secondary purification stage.

6 Claims, 10 Drawing Figures

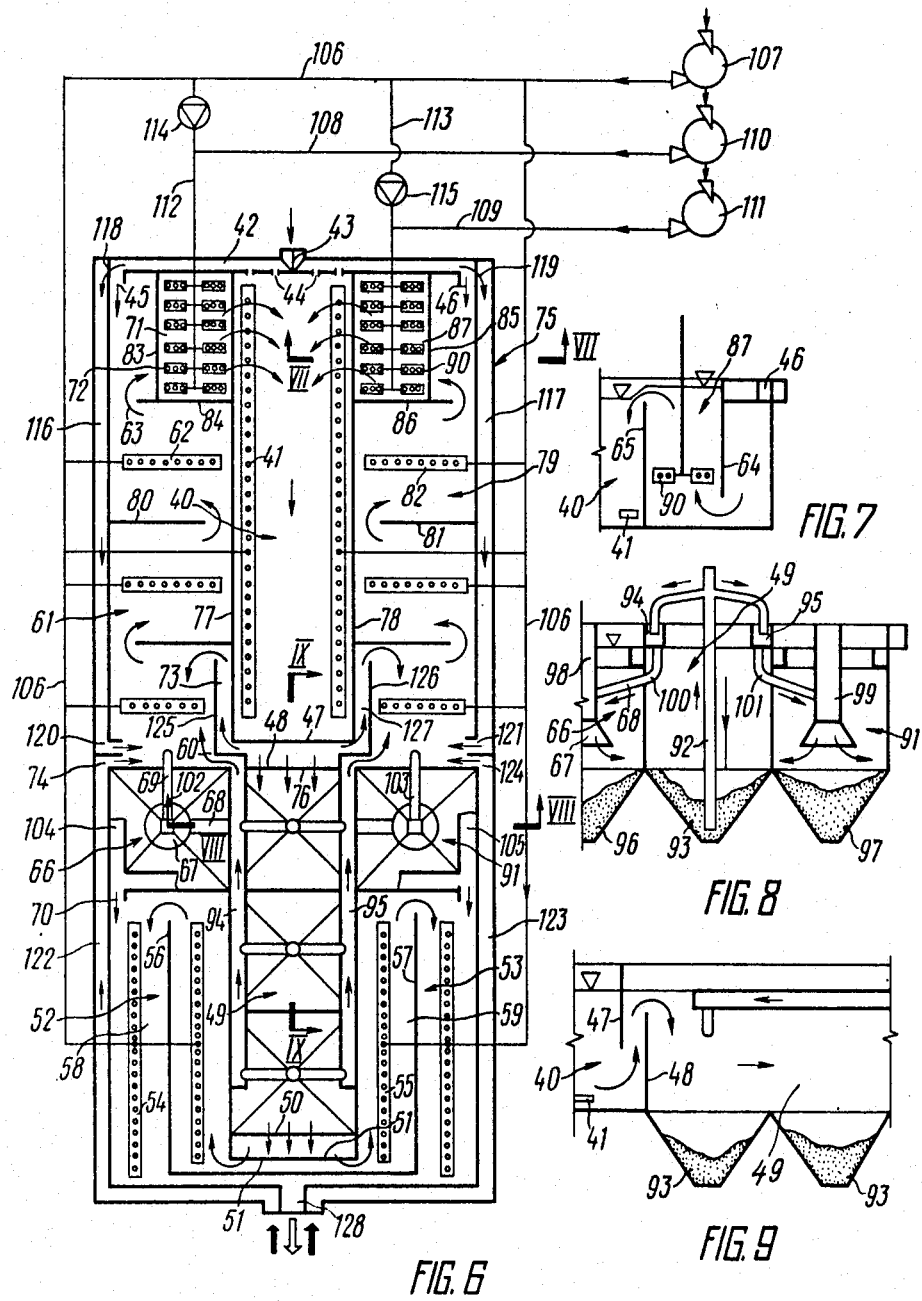

METHOD OF BIOLOGICAL PURIFICATION OF WASTE WATER

FIELD OF THE INVENTION

The invention relates generally to removing organic pollutants from waste water. More particularly, the invention concerns a method of biological purification of waste water by activated sludge and an aeration tank for effecting such a method.

The invention can be used most effectively for complete biological purification of concentrated industrial sewage water containing hard-to-oxidize organic contaminants, particularly when the rate of flow of waste water delivered for purification and its composition vary through the day.

The proposed invention can also find application during complete biotreatment of municipal sewage water discharged by waste-water disposal systems in which all types of waste water, particularly domestic, industrial and rain water, are conveyed along a common network of pipes and canals outside the city area.

The invention can be used as successfully for complete biotreatment of municipal sewage water discharged by separate waste-water disposal systems, for example, when rain water and relatively pure industrial water are evacuated along one system of pipes and canals, while domestic and polluted industrial waste water is conveyed through one or several waste water discharge networks, or when waste water is discharged through a combination of waste-water disposal systems.

PRIOR ART

Methods of biological purification of waste water by activated sludge are generally based on the ability of aerobic microorganisms to consume various, primarily organic, matter contained in waste water as a nutrient substance by oxidizing such organic matter in the course of metabolic processes. Therefore, artificially cultivated microorganisms the concentrate of which is known as activated sludge act to render the waste water free of pollutants thereby feeding on the pollutants and providing for a build-up of biomass. A variety of organic matter can be treated (oxidized) biologically. Also susceptible to biotreatment are some mineral compounds, such as hydrogen sulfide, ammonia, nitrites, etc. However, sewage water carries substances which are immune to biooxidation or can be oxidized only partially. Biological purification is considered complete when the biochemical oxygen demand (BOD) of the treated water is less than 20 mg/l and incomplete at a BOD of over 20 mg/l. This definition is considered to a certain extend provisional, as even after complete biotreatment the purified water contains impurities.

Biological purification of waste water is normally carried out in reinforced concrete vessels referred to as aeration tanks. In aeration tanks a mixture of waste water and activated sludge or sludge mixture of 1.5 to 2.5 g/l concentration is subjected to continuous aeration by an oxygen-containing gas (such as air) fed through dispersers, after which the sludge is separated from the purified waste water to be recycled back to the aeration tanks.

In terms of the hydrodynamic structure of the flows of sludge mixture there are distinguished displacement-type aeration tanks in which waste water and activated sludge are admitted to and discharged from opposite tank ends, and mixing-type aeration tanks in which the incoming waste water is instantaneously mixed in the entire tank volume. Practice has shown that the displacement-type aeration tanks are advantageous for high-degree purification of waste water at relatively low process loads, whereas the mixing-type aeration tanks fail to provide a high degree of purification, but are capable of coping with high process loads and maintaining process stability even when the incoming waste water contains toxic substances.

Wide prolifiration have found at present one-stage aeration tanks and two-stage aeration tanks with regenerators. The one-stage aeration tanks are comparatively simple to operate, although their field of application is rather limited. In addition, one-stage aeration tanks suffer from a number of disadvantages. For example, such tanks do not provide for envigorating the treatment process through increasing the mass of activated sludge. In addition, during peak inflows of waste water containing toxic impurities the activated sludge is prone to losing partially or completely its capabilities. The aforedescribed disadvantages are obviated in aeration tanks provided with regenerators in which a mixture of waste water and activated sludge is aerated for a minimum length of time sufficient for attaining the required purification effect in terms of BOD, whereafter recyclable sludge is separated in a settling tank and transferred to the regenerator where the processes of oxidation of adsorbed pollutants are terminated and the sludge recuperates its initial properties. Another advantage of the aeration tank having a regenerator is that it requires smaller working volume. In addition, deteriorated capacity of the activated sludge in the aeration tank, such as due to the presence of toxic impurities carried by the incoming flow of waste water, can be compensated for by recycling the activated sludge from the regenerator. One advantageous feature of two-stage aeration tanks resides in that each purification stage develops activated sludge of a specific capacity, whereby it becomes possible to carry out complete biotreatment of highly concentrated sewage containing hard-to-oxidize organic pollutants.

It is known that the amount of organic impurities carried by the incoming flow of waste water varies through the time of day, this non-uniform rate of delivery being due to two factors, particularly erratic inflows of waste water delivered for purification and variations in the concentration of contaminants carried by the waste water. When the effect of these two factors coincide, process loads imposed on aeration tanks during certain hours of the day may be 3 to 5 times above the average. Efficient operation of aeration tanks is determined by a number of conditions, among which are: composition and properties of waste water, hydrodynamic conditions for stirring the working medium, ratio between the amount of contaminants fed with the waste water and concentration of activated sludge, and oxygen saturation conditions of the aeration tank. In practice, sharp process load fluctuations intolerable for any living cell tend to incapacitate the activated sludge thus causing it to lose its oxidation power and ability to settle, which not only affects the quality of purification, but may completely disrupt the operation of the aeration tank as well. In order to make the operation of the aeration tanks less susceptible to process load fluctuations, the working volume of sewage treatment facilities must be substantially greater and the electric power expences higher. For example, when purifying municipal sewage water the contact between waste water and activated sludge lasts 6 to 8 hrs on the average, whereas the specific consumption of air, depending on the amount of contaminants present in the incoming water, amounts to between 5 and 15 m$^3$ per 1 m$^3$ of purified water. At an incoming waste water flow rate of 50 thousand m$^3$ per day discharged by a dwelling area of medium size the volume of aeration tanks amounts to between 20 and 25 thousand m$^3$, whereas the daily consumption of electric power for aeration may reach as much as 7 to 10 thousand kWh, a considerable part of said volumes and power expenditures being utilized non-productively.

There is known a method of biological purification of waste water by activated sludge in a one-stage aeration tank (cf., Japanese Application No. 57-28316, IPC C 02 F 3/12) in which incoming waste water is mixed with activated sludge, the thus obtained sludge medium is aerated, and recyclable sludge is then separated from the sludge medium to be reintroduced again for mixing with the incoming waste water, whereas the purified waste water is conveyed for further treatment, such as chlorination. While fluctuating process loads in terms of concentration of pollutants carried by the incoming waste water is controlled by measuring the concentration of activated sludge and the amount of BOD, continuity in the ratio between organic contaminants carried by the incoming waste water and activated sludge is optimized by varying the concentration of activated sludge in the system through controlling the amount of excess sludge being removed.

This method ensures reliable high-quality purification of waste water that is relatively simple in composition and only when process loads fluctuate moderately and smoothly.

However, in practice such process conditions are rare. Therefore, in by far most common instances when waste water carries a multitude of different organic impurities and process load fluctuations within a time spell of several hours are substantial the use of the aforedescribed method fails to bring an appreciable advantageous effect.

Aside from the above disadvantage, gravity separation of concentrated sludge medium into recyclable sludge and purified water is accompanied by excessive discharge of suspended solids to negatively affect the quality of purification process. When using subsequent to biotreatment such fine filter units as sand or charcoal filters, ozonizers, ion-exchangers and the like, these are prone to premature failure if the content of suspended matter in the incoming waste water exceeds 15 to 20 mg/l.

There is also known a method of biological purification of waste water by activated sludge in two stages (cf., West German Application No. DE 2,936, 884 AI, IPC C 02 F 3/12), the first stage comprising the steps of aerating sludge medium and subsequently separating the sludge medium and regenerating activated sludge, while the second stage includes aeration and evacuation of residual activated sludge.

This method is capable of purifying highly polluted industrial sewage (over 1000 mg/l BOD) containing impurities that are difficult to oxidize.

However, although the above method can be used for purifying industrial waste water, its range of practical application remains rather narrow. Specifically, when process loads fluctuate, the first stage operates with invariable concentrations of activated sludge and therefore fails to maintain an optimum ratio between the amount of organic impurities brought in by the incoming flow of waste water and the required concentration of activated sludge. Overloads are especially pronounced in the starting zones of the first purification stage to result in a loss of waste water purification stability, and a tendency of sludge to swell and lose its capacity to settle. Therefore, the second purification stage receives, along with excessive amounts of suspended matter, considerable amounts of pollutants that fail to be oxidized in the first stage, which affects the operation of the second purification stage and results in an escape to the purified water of substantial quantities of hard-to-oxidize impurities.

In order to make the waste water purification process more stable, it is necessary to make the first or primary purification stage less responsive, or increase the working volume of the process facilities two- to three-fold, which in turn results in higher construction costs and calls for considerable construction site areas. Operation expenses, primarily those for aeration, also grow sharply, since in order to promote the activity of activated sludge in oxygen deficiency, aeration must be vigorous. During low process loads, such as in the night hours, excessive aeration acts to disintegrate the activated sludge which breaks into finer particles relatively easily due to the lack of nutrient substrate. The thus disintegrated sludge is entrained by air bubbles to be carried up to the surface and form a flotation mass or foam. In consequence, foam formation hampers the sludge separation process, affects the quality of purified water and sharply reduces the concentration of activated sludge in the system. Normally, it occurs in the night hours when visual monitoring of the process is difficult.

In the aforedescribed prior art method the intensity of aeration in response to the loads imposed on the system is varied by the number of air blower in operation, which results in less uniform aeration and less efficient utilization of oxygen.

SUMMARY OF THE INVENTION

These objects and attending advantages are attained by that in a method of biological purification of waste water through removing organic contaminants therefrom by activated sludge in two stages, the primary stage involving mixing the incoming waste water with activated sludge, aerating the thus obtained sludge medium and thereafter separating from the sludge medium of an end zone of the primary purification stage recyclable sludge which is regenerated for the thus regenerated activated sludge to be conveyed for mixing with the incoming waste water admitted to a starting zone of the primary purification stage; the secondary purification stage involving aerating sludge water formed after separating recyclable sludge from the sludge medium and removing activated sludge therefrom, according to the invention, the recyclable sludge delivered for regeneration is divided into two flows or portions one of which is fed directly for regeneration, whereas the other is compacted prior to regeneration and then mixed with the first portion of the recyclable sludge for joint regeneration while maintaining at the primary purification stage a continuous ratio between the amount of organic contaminants carried by the incoming waste water and activated sludge.

It is an object of this invention to provide a thorough biological purification of waste water under considerable waste water inflow fluctuations and variations in the concentration of organic pollutants in the incoming waste water.

Another object is to reduce the working volume of aeration tanks while maintaining a very high degree to which waste water is purified.

One more object is to substantially reduce un productive expenditures of electric power for aeration during purification of waste water.

The division of the flow of recyclable sludge into two portions of which one is compacted prior to regeneration makes it possible to shorten the time required for separating recyclable sludge from the sludge medium from the conventional 1 to 1.5 hours to between 15 and 30 minutes, which reduces its residence time in anaerobic conditions and helps retain its activity. Increasing the concentration of recyclable sludge in turn makes it possible to more effectively utilize the working volume of the regenerators and make a more extensive use of the oxygen-containing gas required for regeneration. Finally, an increase in the concentration of activated sludge in the regenerators, while increasing the average concentration of activated sludge in the system, acts to boost the concentration of activated sludge in the primary purification stage to improve their oxidation power, ensure greater process stability under higher process loads, and provide optimized continuity in the ratio between the amount of organic contaminants carried by the incoming flow of waste water and activated sludge.

This provides for making the process of sludge separation 3 to 4 times faster, reducing the volume of recyclable sludge delivered for aeration by 1.5 to 2 times, shortening the duration of aeration of waste water in the primary purification stage 1.1 to 1.3 times, and bringing down by 8 to 12% the amount of oxygen-containing gas (air) conveyed for sludge regeneration.

Preferably, the portion of recyclable sludge subjected to compaction amounts to between 0.2 and 0.8 the total mass of the recyclable sludge delivered for regeneration.

The concentration of recyclable sludge conveyed for regeneration depends on its compaction and settling (sedimentation) capacities, and may vary within a very wide range. Sedimentation capacity of sludge determined by its species composition and bacterial physiology depends primarily on the type of waste water and a number of other factors which dictate physical and chemical conditions for carrying out the waste water purification process. By varying the portion of compactable recyclable sludge from 0.2 to 0.8 of the total sludge mass it is possible to provide an invariable average concentration of recyclable sludge at a predetermined level at various sedimentation capacity of the activated sludge.

Advisably, during a higher inflow of waste water a part of the flow of waste water delivered to the primary purification stage is mixed with the regenerated activated sludge fed to the primary purification stage and subjected to additional aeration by introducing oxygen-containing gas, whereupon the thus obtained sludge medium is mixed with the rest of waste water supplied to the starting zone of the primary purification stage, and subsequent to the treatment in the first purification stage part of the flow of the sludge medium of the end zone of the primary purification stage is directed back to the starting zone of the primary purification stage to be mixed with the recyclable sludge conveyed for aeration, the amount of oxygen-containing gas intended for additional aeration being fed at a rate ensuring vigorous lengthwise mixing of the sludge medium of the primary purification stage by recirculating the flow of sludge medium between the end and starting zones of the first purification stage.

The use of additional aeration during high inflows of waste water ensures that a required quantity of oxygen is introduced. In order to increase the extent to which oxygen is utilized in the course of additional aeration, it is desirable that part of the flow of waste water delivered to the first purification stage be mixed with the regenerated activated sludge fed to this stage, which speeds up the rate of oxygen consumption and facilitates preparation of the sludge to process loads as early as during the regeneration step.

The vigorous mixing action imparted to the sludge medium lengthwise of the vessel between the end and starting zones of the first purification stage alters the hydrodynamic structure of its flow from the conditions of displacement to complete mixing, which facilitates prompt and uniform distribution of the incoming impurities. Therewith, the gradients of concentration of organic impurities, dissolved oxygen, and activated sludge throughout the flow of sludge medium are minimal. A proportional increase in the concentration of activated sludge at the first purification stage is assured during inflow of waste water as a result of mutual balancing of the flows of the regenerated activated sludge and sludge medium.

The aforedescribed operations promote the oxidation power of the first purification stage increasing this power several fold although not affecting the initial quality of the purified water; this advantage being attained at minimized expenditures of electric power without resorting to expansion of the working volumes of the system despite the fact that the waste water inflow may increase 1.5 to 2 times and process load 3 to 5 times.

Preferably, the oxygen-containing gas intended for additional aeration is supplied in the amount providing for a ratio between the recirculation flow of sludge medium and the incoming flow of waste water ranging from 3 to 10.

The oxygen-containing gas introduced to the sludge medium in the course of additional aeration is used for two purposes. On the one hand, it is used to produce a hydrodynamic flow structure approaching conditions of complete mixing when the oxygen-containing gas provides recirculation movement of the sludge medium between the end and starting zones of the first purification stage. On the other, it used to introduce added amounts of dissolved oxygen to the sludge mixture required for carrying out oxidation processes necessary to purify the waste water.

In cases when the incoming waste water contains relatively low concentrations of impurities in terms of BOD (up to 150 mg/l), a first objective is pursued, and the minimum ratio of the recirculation flow of sludge medium to the incoming flow of waste water is 3. In other instances, when the concentration of organic matter in the waste water delivered for purification is high, a second objective is pursued, and the maximum ratio of the recirculation flow of sludge medium to the incoming flow of waste water is 10.

The aforedescribed makes it possible to optimize the consumption of electric power during substantial inflows of waste water and during the so-called peak loads through a more efficient use of the oxygen-containing gas for both transfer and oxidation.

Favourably, from one third to two thirds of the flow of the incoming waste water delivered for purification is fed for preliminary mixing with the regenerated sludge.

The range of possible fluctuations in the inflow of waste water is within 1.3 to 3.0 the average incoming flow. Otherwise stated, during a growth in the inflow from one third to two thirds of waste water is additionally delivered for purification. For stabilizing the purification process at the primary stage it is advisable to subject the extra amount of waste water to additional aeration and mixing with regenerated activated sludge.

The above range is most favourable, since a departure toward reduction would cause oxygen losses and, conversely, toward an increase would cause a shortage of dissolved oxygen in the additional aeration zone to affect the waste water purification process.

Advisably, the sludge water formed as a result of compaction of the portion of activated sludge delivered for regeneration is admitted to the secondary purification stage to be subjected to aeration, whereas the flow of activated sludge separated after the secondary purification stage is fed for mixing with the recyclable sludge conveyed for regeneration.

The sludge water formed during compaction of recyclable sludge contains a considerable amount of suspended particles of poor settlability which are preferably to be aerocoagulated by blowing-through small quantities of oxygen-containing gas prior to final sedimentation. This action promotes buildup of an electrostatic charge on the surface of sludge flakes whereby they are more easily attracted to each other to speed up sedimentation. Also, some difficultly oxidizable impurities may escape from the first purification stage to the second, and these impurities are deoxidized by the sludge medium of the secondary purification stage operating under low process loads.

The total amount of sludge evacuated by the sludge water to the secondary purification stage may be greater than the amount of excess activated sludge. In addition, during certain periods of operation it is advisable that part of the activated sludge evacuated from the secondary purification stage be fed for mixing with the recyclable sludge delivered for regeneration to maintain high concentrations of the activated sludge in the waste water purification system.

The abovedescribed operations facilitate stable and fine purification of waste water of fluctuating inflow with a minimum of power expenditures and working volumes of the system reduced by 1.5 to 2 times.

The proposed method is preferably practised in an aeration tank comprising an elongated mixing vessel of the primary purification stage provided with dispersers of oxygen-containing gas and having a starting zone in which there are disposed inlet means for admitting waste water and activated sludge to this vessel, and an end zone in which there is disposed an outlet of sludge medium communicated with a sludge separator capable of separating recyclable sludge from the sludge medium and having an outlet of purified sludge water communicable with a displacement vessel of the secondary purification stage provided with dispersers of oxygen-containing gas and a sludge separator, and an outlet of recyclable sludge communicated with a regeneration chamber having dispersers of oxygen-containing gas an outlet of which communicates with an inlet means for admitting regenerated activated sludge to the mixing vessel of the primary purification stage. According to the invention, the aeration tank is provided with a sludge compactor to increase the concentration of recyclable sludge and having an inlet communicable with an outlet of recyclable sludge of the sludge separator and outlets of recyclable sludge and sludge water, the first outlet being communicated with the inlet of the regeneration chamber, whereas the second outlet communicates with the inlet of the displacement vessel of the secondary purification stage.

The use of the sludge compactor for increasing the concentration of recyclable sludge in combination with a short duration of sludge separation make it possible not only to increase the population of bacteria that clarifies waste water, but also thanks to sludge compacting in aerobic conditions to maintain the oxidation power of the activated sludge at a sufficiently high level.

In consequence, impurities tend to be oxidized at a faster rate, which affords to considerably reduce the working volume of the aeration tanks.

Advisably, the aeration tank is provided with a prechamber having dispersers of compressed air and arranged between the outlet of the regeneration chamber and the inlet means for admitting regenerated activated sludge to the mixing vessel of the primary purification stage, the prechamber being also communicated with an inlet means for admitting waste water to the mixing vessel of the primary purification stage, whereas the regeneration chamber communicates with the mixing vessel of the primary purification stage at its end zone.

The actual schedule of fluctuations in the process loads imposed on the waste water purification facilities has, as a rule, two extremes or peaks, these peak loads normally taking place in the morning and evening hours. The more accurately the stepped schedule of controllable variations in the oxidation power of the aeration tank coincides or "registers" with the schedule of load fluctuations, the less are unproductive power expenditures, and the more technologically and economically advantageous is the waste water purification system. Such an accuracy is attained by varying the number and operating capacity of the prechambers. For convenience of controlling and technical and economic efficiency it is advisable to provide the aeration tank with one main and one auxiliary prechambers.

Preferably, the sludge separator of the second purification stage communicates by its activated sludge outlet with an inlet of the regeneration chamber.

The possibility of feeding the activated sludge to the regeneration chamber after the sludge separator of the secondary purification stage, if viewed as periodic recirculation of activated sludge from the second purification stage to the primary purification stage, helps maintain the required concentrations of activated sludge in the primary purification stage during peak process loads. This also provides an equilibrium between the activated sludge circulating in the purification system and excess activated sludge removable from the system.

Advisably, the aeration tank comprises an elongated housing open at the top and separated by a transverse partition into two sections, the first of these sections accommodating longitudinal partitions defining lengthwise of the longitudinal centerline of the housing the mixing vessel of the primary purification stage the interior of which vessel contains dispersers of oxygen-containing gas and defines with the walls of the housing the main regeneration chamber and an auxiliary regeneration chamber, these regeneration chambers being arranged on the sides of the mixing vessel of the primary purification stage and having transverse partitions dividing the regeneration chambers into sections accommodating each dispersers of oxygen containing gas, whereas mounted in proximity to the starting zone of the mixing zone of the mixing vessel outside of the longitudinal partitions are arranged longitudinal and transverse partitions defining main and auxiliary prechambers communicated through by-passes with the main and additional regeneration chambers and by spillways with the vessel and provided with dispersers of oxygen-containing gas, the second section accommodating arranged in line with its axis a horizontal gravitation-type sludge separator communicating by a spillway with the mixing vessel of the primary purification stage and defining with the walls of the second section a mixing vessel of the secondary purification stage, vertical gravitation-type sludge compactors communicating with the main and auxiliary regeneration chambers being arranged in proximity to the transverse partition of the housing, the sludge separator being provided with airlifts to feed along sludge-removal troughs recyclable sludge of increased concentration to the main and auxiliary regeneration chambers.

The arrangement of the main waste water purification facilities in a single housing pursues several objectives. It enables savings in the amount of materials required for the construction of the aeration tank and reduces the overall production area thanks to the employment of adjacent partitions and reduction in the length of the inlet means. For some facilities such unitization is of crucial importance. For example, connection of the regeneration chambers and prechambers to the mixing vessel of the first purification stage operating during sudden inflows of waste water according to the principle of communicating vessels makes it possible to minimize the amount of power for the transfer of the recirculating medium.

The gravitation sludge separators and sludge compactors allow to maintain high concentration of recyclable sludge at minimum power expenditures without disturbing the structure of sludge flakes.

The use of airlifts for transferring activated sludge from the sludge separator to the sludge compactors, and from the sludge compactors to the regeneration chambers adds to the system simplicity and allows to saturate activated sludge with dissolved oxygen during sludge compaction, which helps preserve its useful properties.

BRIEF DESCRIPTION OF THE DRAWINGS

The invention will be more fully understood from a description of various preferred embodiments thereof that follows with reference to the accompanying drawings, in which:

FIG. 6 is a general view of the proposed aeration tank;

FIG. 7 is a section along the line 7—7 in FIG. 1;

FIG. 8 is a section along the line 8—8 in FIG. 1;

FIG. 9 is a section along the line 9—9 in FIG. 1; and

DETAILED DESCRIPTION OF THE INVENTION

Figure 1:
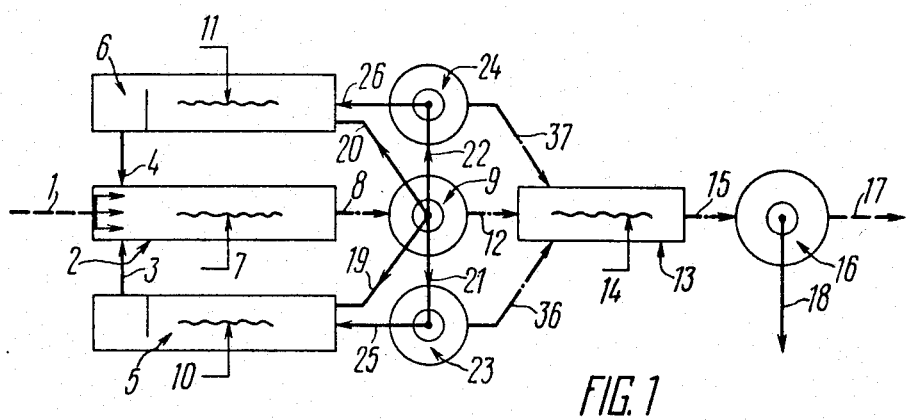
FIG. 1 is a schematic illustration of a sequence of process operations of the proposed method of waste water biopurification during an average inflow of waste water.

The essence of the proposed method of biological purification of waste water by activated sludge resides in as follows.

The incoming waste water 1 (FIG. 1) is supplied to a primary purification stage 2 where it is mixed with regenerated activated sludge 3, 4 having a sludge concentration about 8 g/l fed from regenerators 5, 6 and the thus obtained sludge medium having a sludge concentration of from 1.5 to 0.5 g/l is aerated by oxygen-containing gas 7, such as air. In the course of fine-bubble diffusion aeration dissolution of oxygen of the gas bubbles takes place to provide aerobic conditions for the microorganisms of the activated sludge to purify the waste water. In the primary stage 2 incoming organic impurites tend to be adsorbed and partially oxidized by activated sludge flakes, whereafter recyclable sludge of 4 to 7 g/l concentration is separated from sludge medium 8 of an end zone of the primary purification stage 2, such as by gravity, this separation taking place in a sludge separator 9 of the primary purification stage 2.

In order to recuperate the initial properties of the activated sludge separated from the end zone of the primary purification stage 2, which tends to diminish as it adsorbs the incoming organic impurities, the sludge is subjected to aerobic treatment within several hours in the course of which the activated sludge, while being retained in the regenerators 5, 6, digests the adsorbed impurities and is aerated by oxygen-containing gas 10, 11. The thus obtained activated sludge is again fed for mixing with the waste water 1 delivered to the starting zone of the first purification stage 2, and the process is repeated.

During separation of recyclable sludge from the sludge medium 8 of the end zone of the primary purification stage under conditions of surface contact of short duration (between 15 and 30 min) sludge water 12 is formed which includes not less than 90% of waste water and dischargeable activated sludge of poor settlability having a concentration of between 0.2 and 0.5 g/l. For a more complete separation from this sludge water of the suspended solids of poor settlability, as well as for biological deoxidation of the remainder of the hard-to-oxidize organic impurities contained in the waste water the sludge water is directed to a secondary purification stage 13 where it is subjected to aeration 14. Aeration in the secondary stage 13 is accompanied by that flakes of activated sludge tend to grow in size and weight as a result of biocoagulation, whereupon within 1 to 1.5 hrs activated sludge is separated from sludge medium 15 of the secondary stage 13 in a sludge separator 16 to a completely purified (BOD=10-15 mg/l) waste water 17, which water is then evacuated from the aeration tank, such as for desinfection prior to discharging to a water basin. Excess activated sludge 18 settled and compacted in the sludge separator 16 of the secondary purifications stage to a concentration of 9 to 12 g/l and formed due to a build-up of recyclable sludge of the primary purification stage is removed for further treatment and utilization.

According to one feature of the invention, the recyclable sludge fed for regeneration is divided into two flows or portion of which one portion 19, 20 is conveyed directly to the regenerators, whereas the other, particularly 21, 22, is compacted (or preliminarily increased in concentration) in sludge compactors 23, 24, whereafter compacted sludge 25, 26 is mixed with the first portion 19, 20 of the recyclable sludge for joint regeneration.

The separation of the flow of recyclable sludge delivered for regeneration into two portions and compacting one such portion 21, 22 prior to regeneration to increase the average concentration of recyclable sludge makes it possible to cope with a number of technical problems, particularly to reduce from the conventionally required 1-1.5 hrs to 15-30 min the time necessary for separating recyclable sludge from the sludge medium 8 to maintain sludge activity and minimize its residence time in anaerobic conditions; to improve by half or even twofold the efficiency of the working volume of the regenerators 10, 11 and increase by no less than 3 to 4% the degree to which oxygen supplied to the regenerators in the course of aeration 10, 11 is utilized resulting in a 15 to 20% improvement in the utilization of oxygen-containing gas; and to increase the concentration of activated sludge in the primary purification stage to between 2.5 and 3 g/l to result in improved stability of waste water purification process through maintaining an optimized continuity in the ratio between organic impurities contained in the incoming waste water and activated sludge under high process loads.

The ratio between organic impurities carried by incoming waste water and activated sludge is expressed in biochemical oxygen demand or BOD per 1 g of activated sludge per unit time (24 hrs). The most favourable ratio depends on the type of waste water, the character of water purification process and the required degree of water purification, this ratio being very specific and is determined experimentally. It can be assumed that for municipal sewage water and industrial waste water close in composition to municipal sewage the optimum ratio between organic contaminants brought in by the incoming water to the primary biological purification stage and activated sludge is within 0.8 to 1.0 BOD/g of activated sludge per day. This ratio helps attain practically complete biotreatment and is considered the most favourable or optimum, since when its value is smaller the quality of purification is sufficiently good, but the oxidation power of the activated sludge is utilized insufficiently, whereas at a higher ratio the activated sludge has a tendency to swell to affect the purification process and cause major process inconveniencies.

In order to avoid the dependence of recyclable sludge concentration on its settlability, it is advisable that the portion of recyclable sludge to be subjected to compaction would amount to substantially from 0.2 to 0.8 the total mass of the recyclable sludge conveyed for regeneration.

This affords to maintain in the aeration tanks of the primary purification stage a concentration "a" of activated sludge of up to 3 g/l, which ensures stability of the process under high process loads. The concentration "a" of activated sludge in the primary purification stage and the concentration "$a_o$" of the sludge being regenerated are interconnected by the relationship:

$$a = \frac{\alpha a_o}{1 + \alpha},$$

where $\alpha$ is a fraction of recyclable sludge from the rated inflow of waste water equal to 0.5-0.6. Then $$a = a_0 \left( \frac{1 + \alpha}{\alpha} \right) = 3 \cdot \frac{1 + 0.6}{0.6} = 8 \text{ g/l}.$$

In turn, the "$a_o$" value is connected with the concentration "$a_1$" of non-compacted and concentration "$a_2$" of compacted recyclable sludge by a relationship:

$$a_o = \frac{a_1 q_1 + a_2 q_2}{q_1 + q_2},$$

where $q_1$ and $q_2$ are the amounts of non-compacted and compacted sludge expressed in unit fractions.

The values "$a_1$" and "$a_2$" depend on the type of waste water and many other factors determining the capacity of sludge to settle and compact. Accordingly, for the well settable sludge $a_1=7$ g/l, $q_1=0.8$, and $a_2=12$ g/l, $q_2=0.2$; whereas for poorly settlable sludge $a_1=4$ g/l, $q_1=0.2$ and $a_2=9$ g/l, $q_2=0.8$. The correctness of these relationships can be evidenced by the following:

for well settable sludge $$a_o = \frac{7 \cdot 0.8 + 12 \cdot 0.2}{0.8 + 0.2} = 8 \text{ g/l};$$

for poorly settlable sludge $$a_o = \frac{4 \cdot 0.2 + 9 \cdot 0.8}{0.2 + 0.8} = 8 \text{ g/l}.$$

Regeneration of activated sludge having a concentration over 8 g/l is not advisable because it entails deterioration of sludge medium mixing, affects mass transfer of oxygen to the liquid, promotes foam formation, and hampers sludge tranfer.

Figure 3:
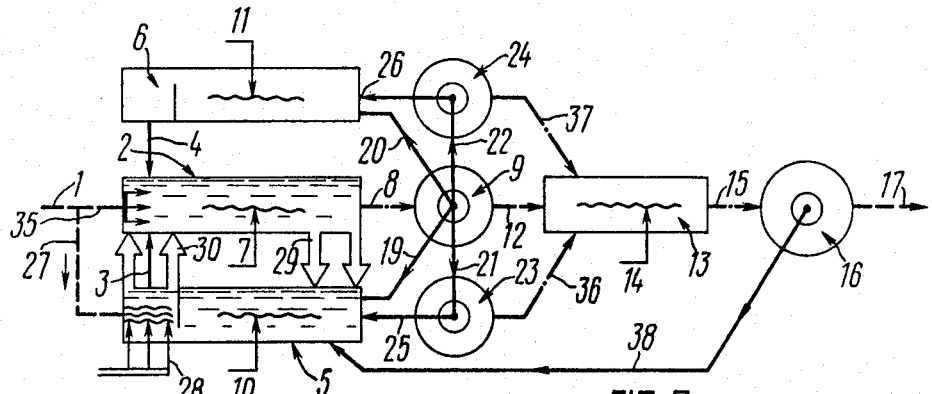
FIG. 3 is the same as illustrated in FIG. 1 at increased inflow of waste water.
Figure 4:
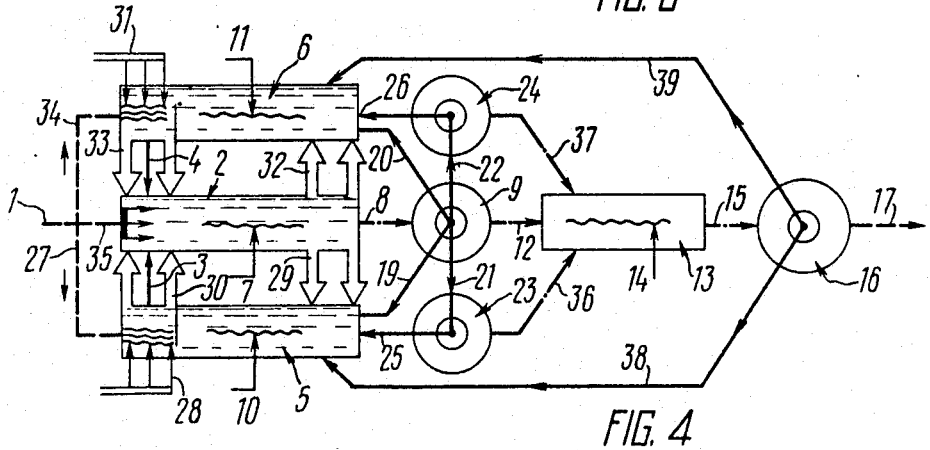
FIG. 4 is the same as illustrated in FIG. 1 at a peak inflow of waste water.

With reference to FIGS. 1, 3 and 4, there is shown a sequence of operations of the proposed method of biological purification according to the invention. The dotted line shows the flows of incoming and purified water, the solid line indicates the flows of recyclable and excess sludge of over 4 g/l concentration, whereas the dash-dot line indicates the flows of sludge medium of the end zones of the primary and secondary purification stages and sludge water subsequent to sludge separation and compaction.

Figure 2:
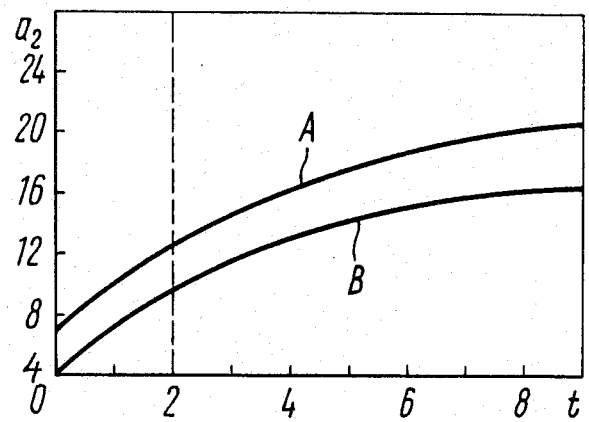
FIG. 2 shows a dependence between the concentration ($a_2$) of the compacted portion of recyclable sludge and the residence time (t) thereof in a sludge compactor.

FIG. 2 represents an experimentally obtained dependence between the concentration $a_2$ of the compactable portion $q_2$ of recyclable sludge expressed in g/l and the residence time (t), expressed in hours, in the sludge compactor for well settable sludge (curve A) and poorly settlable sludge (curve B). A length of time from 0 to 2 hours is in effect the zone of aerobic compaction of recyclable sludge when microorganisms retain their aerobic activity. In the space of time over 2 hours the recyclable sludge may still be concentrated to as much as 20-30 g/l, although this takes place anaerobically, when its activity slackens and can be recuperated through extended residence time. As follows from the curves A and B, rated concentrations $a_2$ of recyclable sludge posessing different sidimentation ability (9 and 12 g/l, respectively) can be attained in aerobic compaction.

During a high inflow of waste water or at increased percentage of organic impurities being brought in by the waste water, or when both these factors come into play, the ratio between organic contaiminants of the incoming waste water and activated sludge in the primary stage of biological purification may exceed the optimum by over 1.5 times. In order that the above ratio be maintained at a level close to the most favourable during high inflows of waste water, it is necessary to operatively increase the concentration of activated sludge in the sludge medium by over 1.5 times. Also, extra amounts of oxygen must be added to the process, whereas the hydrodynamic structure of the flow of sludge medium must be brought closer to the conditions of complete mixing to ensure stable purification parameters from the starting to end zones of the primary purification stage.

With reference to FIG. 3 this is attained by that during high inflows of water part 27 of the flow delivered to the first purification stage is mixed with the regenerated activated sludge 3 fed to the first purification stage to be subjected to additional aeration indicated at 28 by feeding oxygen-containing gas, whereupon the thus obtained sludge medium is mixed with the other part of waste water delivered to the starting zone of the primary purification stage 2. After treatment in the primary purification stage part 29 of the flow of sludge medium of the end zone of the primary purification stage 2 is directed back to the starting zone of the primary stage to be mixed with the recyclable sludge 19, 25 delivered for regeneration.

An increase in the concentration of activated sludge in the primary purification stage in response to the growing process loads during high inflows of waste water is ensured by rapid mutual averaging of the flows of regenerated activated sludge fed from the regenerator 5 and sludge medium. Taking into account the fact that the concentration of regenerated activated sludge 3 amounts to substantially 8 g/l and that the average concentration of activated sludge in the sludge medium 8 is 2 g/l, then having regard to possible volumes of the regenerator 5 and mixing vessel of the primary purification stage 2, the working concentration of activated sludge during high inflows of waste water amounts on the average to 4 g/l. This means that the employment of the above techniques helps maintain optimized ratios between organic impurities and activated sludge when process loads progressively increase to twice the previous level.

In order to improve the extent to which oxygen is utilized in the course of additional aeration 28, part 27 of the flow of waste water conveyed to the primary purification stage is preferably mixed with the regenerated activated sludge 3 fed from the regenerator to the primary purification stage, which increases the extent of oxygen utilization to 10–12% by accelerating the rate of its consumption and adapts the sludge to the process load as early as during the final stage of regeneration.

The oxygen-containing gas intended for additional aeration 28 is preferably fed in a quantity sufficient not only for sustaining the accelerated oxidation rate of pollutants, but also for providing vigorous longitudinal mixing of sludge medium of the primary purification stage through recirculating sludge medium flow 29, 30 between the end and starting zones of the primary purification stage.

Increased percentage of pollutants brought in during high inflows of waste water to the primary purifications stage tends to locally overload the activated sludge and reduce the concentration of oxygen dissolved in the sludge medium in the starting zone of the primary purification stage to less than 2 g/l. This situation is very undesirable, because it disrupts the stability of the thorough biopurification of waste water by activated sludge. To avoid it, the rate of recirculation flow 29, 30 of the sludge medium between the end and starting zones of the primary purification stage 2 must be kept at a level corresponding to the growing amount of impurities carried by the incoming waste water. This can be attained by additional feeding of oxygen-containing gas 28 in the amount sufficient for bringing the hydrodynamic structure of the flow of sludge medium to conditions of complete mixing and by maintaining the stable concentrations of activated sludge, organic impurities and dissolved oxygen throughout the length of the primary purification stage 2.

During certain periods in operation of the aeration tank when the inflow of waste water is at its peak level the increase in the concentration of activated sludge in the first purification stage to 4 g/l may prove sufficient to maintain an optimum ratio between organic impurities and activated sludge. This may occur, for example, when the process load (in terms of organic contaminants) triples, rather than doublefolds. In order that the quality of waste water purification remain high despite the maximum rate of inflow of waste water, along with the recirculation flow 29, 30, the recirculation flow 32, 33 of the sludge medium 8 is subjected to additional aeration 31 by oxigen-containing gas, this latter flow 32, 33 circulating from the end zone of the primary stage 2 to the regenerator 6 and from the regenerator 6 to the starting zone of the primary purification stage, respectively, to which there is fed a part 34 of the incoming waste water (FIG. 4). Remaining part 35 of the waste water is conveyed to the primary purification stage. Thanks to the rapid mutual averaging of the flows of regenerated activated sludge of 8 g/l concentration and the sludge medium, the working concentration of activated sludge in the first purification stage will average 6 g/l. The aforesaid evidences that the use of such techniques ensures the most favourable ratio between the organic impurities and activated sludge under the progressively and rapidly growing loads to three times the initial magnitude; it also ensures that added amounts of dissolved oxygen are introduced for successful microbial action.

The controllable recurculation of the flows 29, 30, 32, 33 of irregular intensity from the end zone of the primary purification stage to its starting zone is technically a most simple and effective means for ensuring a flexible control over the process of waste water purification in an aeration tank. The starting or most loaded zone of the primary stage involves not only purely hydraulic dilution of the incoming waste water with purified water, but also its biological dilution by recirculation flows 29, 30, 32, 33 of fresh activated sludge. To provide favourable conditions for biological oxidation of organic impurities within a wide range of incoming loads, oxygen-containing gas intended for additional aeration 28, 31 is fed at a rate sufficient for ensuring a ratio of the recirculation flow of sludge medium to the incoming flow 1 of waste water in a range of between 3 and 10.

Figure 5:
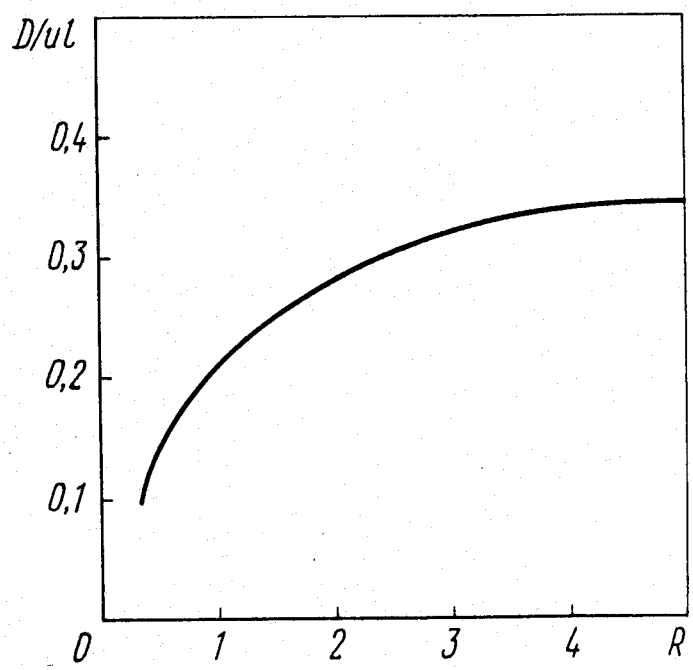
FIG. 5 shows a dependence between the hydrodynamic structure of sludge medium (D/ul) and the recirculation ratio (R)

The lower limit in the ratio of the recirculation flow of sludge medium to the incoming flow of waste water, or dimensionless recirculation relationship R can be illustrated by diagrams represented in FIG. 5. Plotted on the ordinate are dimensionless values of diffusion factor $D/ul$ characterizing the hydrodynamic structure of the flow of sludge medium, where D is the diffusion coefficient, in $m^2/s$, u is the flow speed, in m/s, and 1 is the linear dimensions of the aeration tank in m. It follows from the diagram obtained experimentally that conditions approaching complete mixing when $D/ul \geq 0.5$ are in evidence in the flow of sludge medium at the value of R close to 3.

During the treatment of municipal sewage and industrial waste water of similar composition the value of $R = 3-5$ is normally sufficient for providing the process with added amounts of oxygen at high process loads, this oxygen being brought in by the recirculating sludge medium.

The maximum value of the parameter $R = 10$ may take place when purifying highly polluted waste water (BOD > 1000 mg/l), that is when it is most important that additional quantities of dissolved oxygen be introduced to the starting zone of the primary purification stage to avoid lack of oxygen for successful aerobic microbial action of the activated sludge.

Because the range of practically possible fluctuations in the inflow of waste water is within a range of from 1.3 to 3 of the average incoming flow, excess parts 27, 34 of the flow of incoming waste water 1 making up from ⅓ to ⅔ of the total flow of waste water delivered for purification are fed for premixing with regenerated sludge 3, 4 conveyed from the regenerators 5, 6.

This technique is aimed at solving several problems, particularly at facilitating the functioning of activated sludge in the starting zone of the primary purification stage, enabling a more complete (up to 10–12%) utilization of oxygen when using additional aeration 28, 31 due to its accelerated consumption by a mixture of regenerated sludge and incoming sludge water, and adapting the activated sludge to the working process loads.

Sludge water 36, 37 formed in the sludge compactors 23, 24 during compaction of the recyclable sludge, such as by gravitation, contains a considerable amount (up to 2 g/l) of difficulty settlable suspended matter. This sludge water should be preferably conveyed to the secondary purification stage 13 and subjected to aeration 14, whereas a flow 38, 39 of activated sludge separable after the second purification stage 13 is to be conveyed for mixing with the recyclable sludge 19, 20, 25, 26 delivered for regeneration.

The concentration of activated sludge in the sludge medium of the secondary purification stage 13 amounts to between 1 and 1.5 g/l, which enables in the course of its aeration 14 to not only improve the sedimentation capacity of the activated sludge prior to feeding it to the sludge separator of the second purification stage, but also to remove from the waste water some hard-to-oxidize impurities conveyed from the primary purification stage 2.

The total amount of sludge evacuated by the sludge water 36, 37 to the secondary purification stage 13 is normally greater than the amount of excess activated sludge 18 subject to removal. Therefore, during the periods of high and peak inflow of waste water removal of the excess activated sludge is temporarily terminated, whereas the activated sludge from the sludge separator 16 of the secondary purification stage with a concentration of 8 to 12 g/l and in the amount of 0.1 to 0.2 of the total flow of waste water is directed to one regenerator 5, or to the two regenerators 5, 6, respectively (FIGS. 3 and 4). This provides a balance of activated sludge in the purification system, and helps maintain higher concentrations of activated sludge in the primary purification stage during peak process loads.

An aeration tank for carrying out the proposed method of biological treatment of waste water by activated sludge comprises an elongated mixing vessel 40 of the primary purification stage provided with dispersers 41 of oxygen-containing gas and having starting and end zones the position of which is determined by the arrangement of inlet means for feeding waste water and activated sludge and outlet means for discharging sludge medium from the mixing vessel.

Biological purification of waste water takes place normally in reinforced concrete tanks where under conditions of continuous aeration by oxygen-containing gas fed through dispersers aerobic microorganisms concentrated to activated sludge act to decompose organic matter absorbing and partially oxidizing it in the course of metabolic processes. The mixture of waste water and regenerated activated sludge, otherwise known as sludge medium, has a concentration of between 1.5 and 2.5 g/l when the amount of pollutants carried by waste water is minimal.

In order to recuperate the oxidation power of recyclable sludge of 4 to 7 g/l concentration obtained as a result of separating sludge water from the sludge medium, it is conveyed to a regenerator, where thanks to continuous aeration the pollutants sorbed by the flakes of activated sludge are oxidized to provide for recuperation of the initial properties of the sludge, after which the thus regenerated activated sludge is recycled to the aeration tanks. Thereby, the thus recycled activated sludge comes into contact with a fresh portion of incoming waste water for the biotreatment process to recommence.

The inlet means for feeding waste water to the mixing vessel 40 include a waste water distribution trough 42 having a butterfly valve 43, a central hole 44, and overlying end face holes 45 and 46. Sludge medium is discharged for separation into recyclable sludge and sludge water in a sludge separator 49 through a damping baffle 47 and an overflow wall 48. The sludge separator 49 is intended to separate recyclable sludge from the sludge medium, the residence time of the sludge medium being 15 to 20 minutes. The sludge separator 49 has an outlet of purified waste water with a concentration of suspended matter of up to 0.5 g/l similar to the outlet of the sludge medium, this former outlet having a spillway 50 and a damping baffle 51 communicating with a displacement vessel 52, 53 of the secondary purification stage provided with dispersers 54, 55 of oxygen-containing gas, longitudinal partitions 56 and 57 dividing the displacement vessel 52, 53 of the secondary purification stage into flow-through passages 58 and 59, and a sludge separator (not shown in FIG. 6).

The two-stage purification enables to effect complete biotreatment of highly concentrated waste water containing pollutants that are hard to oxidize thanks to additional oxidation thereof by microorganisms populating each purification stage.

An outlet 60 of recyclable sludge of the sludge separator 49 communicates with a regeneration chamber 61 having dispersers 62 of oxygen-containing gas an outlet 63 of which communicates with the inlet means for feeding regenerated activated sludge to the vessel 40 of the primary purification stage. The inlet of regenerated activated sludge includes a by-pass 64 and a spillway 65 (FIG. 7).

Apart from the aforedescribed, the aeration tank is provided with a sludge compactor 66 to increase the concentration of part of the recyclable activated sludge separated in the sludge separator 49. The division of the sludge flow supplied for regeneration into two flows, one of which is compacted prior to regeneration, enables to reduce the time required for separation of recyclable sludge from the sludge medium from the conventional 1–1.5 hrs to between 15 and 20 min, which minimizes the residence time of the recyclable sludge in anaerobic conditions and contributes to its activity. Therefore, the average concentration of activated sludge delivered for regeneration may be increased to 4.5–5 g/l, which in turn facilitates a more efficient use of the regenerators and oxygen-containing gas and promotes an increase in the average concentration of activated sludge in the primary purification stage system to 2.5–3 g/l resulting in optimized ratio between the amount of organic contaminants delivered by the incoming waste water and activated sludge, as well as provides for a greater process stability when the inflow of waste water supplied for treatment fluctuates.

The sludge compactor 66 has an inlet 67 communicating with an outlet 68 of recyclable sludge of the sludge separator 49, and outlets 69 and 70 of recyclable sludge and sludge water, respectively; the former of these outlets being communicated with the inlet of the regeneration chamber, whereas the latter communicates with the inlet of the displacement vessel of the secondary purification stage. Clarified liquid obtained after the additional compaction of the recyclable activated sludge is called sludge water and contains considerable amount of suspended solids (up to 2 g/l) removable during the second purification stage.

Apart from the aforedescribed, the aeration tank is provided with a prechamber 71 having dispersers 72 of compressed air, this chamber being arranged between the outlet 63 of the regeneration chamber 61 and the inlet means for feeding activated sludge to the primary stage vessel 40 containing the by-pass 64 and spillway 65 (FIG. 7). The regeneration chamber 61 is also communicated with the vessel 40 in its end zone by a circulation passage 73.

The amount of organic pollutants supplied to the sewage treatment facilitates is erratic throughout the day, this irregularity being due to two major factors, particularly fluctuations in the rate of flow of waste water supplied for treatment and varying concentrations of pollutants carried by the waste water thus supplied. At certain periods of aeration tank operation (normally during morning and night hours) the process loads exceed the average by 3 to 5 times. Under such sharp load variations the activated sludge loses such important properties as oxidation power and the capacity to settle, which results in poor purification. In order to ensure a stable waste water purification quality, it is necessary to provide a margin of working volume in the sewage treatment facilities and make aeration sufficiently vigorous to cope with the maximum possible process loads. Therefore, during a rather low influx of waste water fed for purification the intensity of aeration exceeds the required to result in non-productive expenditures of electric power, breaking up of the flakes of activated sludge, and consequently to an increase in the discharge of suspended matter from the aeration tank and foam formation.

For eliminating the discrepancy between the dynamically varying process loads and belted response of the sewage treatment facilities it is necessary that the purification process be controlled, that is to operatively act on the amount of dissolved oxygen, concentration of activated sludge and the hydrodynamic structure of the incoming flow.

The prechamber is intended to receive sludge medium from the end zone of the aeration tank, saturate it with dissolved oxygen and introduce it to the starting or most loaded zone of the aeration tank; this chamber also effecting the primary biotreatment of a portion of the sewage water supplied to the aeration tank during sudden inflows.

The aeration system providing for operation of the prechamber is called auxiliary, whereas the continuously operating system of aeration in the aeration tank intended to cope with the minimal loads is called a basic aeration system.

Preferably, the sludge separator of the secondary purification stage (not shown in FIG. 6) communicates by its outlet of activated sludge with the inlet 74 of the regeneration chamber 61.

The possibility of feeding activated sludge to the regeneration chamber 61 after the sludge separator of the secondary stage ensures maintaining the required concentration of activated sludge in the primary purification stage during peak process loads. As a result of the living activity of the microorganisms present in the activated sludge the latter grows to excess activated sludge. The aforedescribed technique is used to ensure the required balance between the activated sludge circulating in the sewage water purification system and the excess activated sludge subject to removal from the system for subsequent utilization.

The proposed aeration tank comprises an elongated housing 75 open at the top and separated by a transverse partition 76 into two sections. The first section accommodates longitudinal partitions 77 and 78 defining the vessel 40 of the primary purification stage in line with the longitudinal axis of the housing 75 and accommodating the dispersers 41 of oxygen-containing gas.

The longitudinal partitions 77 and 78 also define with the walls of the housing 75 main and auxiliary regeneration chambers 61 and 79, respectively.

The regeneration chambers 61 and 79 are disposed on the sides of the primary stage vessel 40 and provided with main and additional transverse partitions 80 and 81, respectively, dividing the regeneration chambers 61 and 79 into sections. Each such section accommodates main and auxiliary oxygen-containing gas, dispersers 62 and 82, respectively.

Arranged in proximity to the starting zone of the tank 40 substantially outside the longitudinal partitions 77 and 78 are main longitudinal and transverse partitions 83 and 84, respectively, and additional longitudinal and transverse partition 85 and 86, respectively, forming the main and auxiliary prechambers 71 and 87, respectively, communicating through main and additional by-passes 64 and 88 with the main and auxiliary regeneration chambers 61 and 79, and by way of main and additional spillways 65 and 89 with the tank 40. The main and auxiliary prechambers 71 and 87 are provided with main and auxiliary dispersers 72 and 90, respectively.

The schedule of actual fluctuations in the rate of delivery of waste water to the sewage water tank treatment facilities in terms of the time of day may be broken into three periods: the period of minimum load of up to 2000 g BOD/m$^3$ per day; the period of increased load of up to 5000 g BOD/m$^3$ per day; and the period of maximum load in excess 5000 g BOD/m$^3$ per day. The oxidation capacity of the aeration tank may be controlled depending on the inflow fluctuations of the waste water delivered for purification by successively bringing into operation the main and auxiliary prechambers accompanied by a corresponding operation of the main and auxiliary regeneration chambers. Such a technique enables optimization of the waste water purification process efficiency at minimal process loads thanks to the operation of the main aeration system at a minimum intensity sufficient for keeping the activated sludge in a suspended state and increasing the oxidation power of the aeration tank during high or peak process loads due to successively bringing into operation the main and auxiliary prechambers.

In the second section there is disposed substantially axially therewith a horizontal gravitation-type sludge separator 49 communicating by way of the spillway 48 and damping baffle 47 with the vessel 40 of the first purification stage and forming with the walls of the second section the vessel 52, 53 of the second stage equipped with dispersers 54, 55 of oxygen-containing gas.

Arranged in proximity to the transverse partition 76 of the housing 75 are main and additional vertical gravitation-type sludge compactors 66 and 91 (FIG. 8).

The sludge separator 49 has airlifts 92 communicating sludge hoppers 93 of the sludge separator 49 with sludge-removal troughs 94 and 95, damping partitions 47, 51 and spillways 48, 50 (FIG. 9, 6).

The main and additional sludge separators 66 and 91 have tapered bottoms 96 and 97, respectively, and are provided with central tubes 98 and 99, overflow pipes 100 and 101 connected to the sludge-removal troughs 94, 95, respectively, of the sludge separator 49 and fitted into the central tubes 98 and 99 of the sludge compactors 66 and 91, as well as communicating with the main and additional regeneration chambers 61 and 79 by airlifts 102 and 103 of the recyclable sludge of increased concentration and peripheral troughs 104 and 105 which communicate the sludge compactors 66 and 91 with the vessel 52, 53 of the secondary stage.

The proposed construction of the sludge separator provides uniform separation of activated sludge throughout the length of the aeration tank, reduces operation costs associated with collecting the sediment thanks to dispensing with mechanical means for collecting such sediment, and promotes clarification due to the absence of sediment turbidity. In addition, the gravitation sludge separator and sludge compactors make it possible to maintain a high concentration of activated sludge in the system without breaking up the structure of the flocculent sludge. Also, the use of the airlifts for transferring the separated activated sludge from the sludge separators to the regeneration chambers enables, apart from the basic function, to saturate the activated sludge with dissolved oxygen.

It is to be noted that the dispersers 62 and 82 of the main and additional regeneration chambers 61 and 79, as well as the dispersers 41 of the first stage mixing vessel 40 and the dispensers 54 and 55 of the second stage vessel 52, 53 are connected by pressure lines 106 indicated due to their similarity by the same reference numerals to blowers 107 of the main aeration system; whereas the dispersers 72 and 90 of the main and auxiliary prechambers 71 and 87 are connected by pressure lines 108 and 109 to blowers 110 and 111, respectively, of the auxiliary aeration system; in addition, the dispersers 72 and 90 are connected to the blowers 107 of the main aeration system by way of by-pass lines 112 and 113 having non-return valves 114 and 115.

Apart from the aforesaid, the aeration tank is provided with waste water by-pass troughs 116 and 117 arranged about the periphery of the tank having overfall walls 118 and 119 and inlet ports 120 and 121 communicating the by-pass troughs 116 and 117 with the starting treatment zone of the main and auxiliary regeneration chambers 61 and 79, as well as with by-pass troughs 122 and 123 for compacted sludge having inlet ports 74 and 124 communicating the by-pass troughs 122 and 123 of compacted sludge with the starting treatment zone of the main and auxiliary regeneration chambers. The tank is further provided with flow-guiding vertical partitions 125 and 126 arranged perpendicularly to the transverse partition 76 to define circulation passages 73 and 127, and with longitudinal partitions 56 and 57 disposed in the vessel 52, 53 of the secondary stage to divide it into flowthrough passages 58, 59 by an outlet port 128.

The arrangement of the major facilities in one housing makes it possible to reduce the amount of construction materials required and the overall floor area due to extensive use of adjacent partitions, reducing the length of distribution troughs and dimensions of inlet means; the connection of the regeneration and prechambers to the mixing vessel of the primary purification stage operating under high process loads according to the principle of communicating vessels enables to minimize expenditures associated with the transfer of the recirculation medium, and maintain its activity and structure; the interpositioning of the sludge separator and sludge compactors requires less power for transferring the compacted recyclable sludge and minimizes the residence time thereof in anaerobic (without oxygen) conditions; whereas the employment of airlifts as a transfer means affords to maintain the structure of sludge flakes and increase their activity thanks to extra saturation with oxygen.

The aeration tank according to the invention operates in the following manner.

During minimum process loads amounting to 2000 g BOD/m$^3$ per day, when the butterfly valve 43 assumes intermediate position, waste water flows along the distribution trough 42 through the central holes 44 arranged at a height substantially below the arrangement of the end face holes 45 and 46 and intended for the passage of the minimum continuous flow to enter the mixing vessel 40 of the primary purification stage where it is mixed with activated sludge delivered from the regeneration chambers 61 and 79 by means of the prechambers 71 and 87 by virtue of airlift effect. This airlift effect in the prechambers 71 and 87 is attained during feeding along the by-pass lines 112 and 113 of a portion of air of the main or basis aeration system supplied by the blowers 107 to the dispersers 62 and 82 of oxygen-containing gas of these main and auxiliary prechambers 71 and 87. The non-return valves 114 and 115 provided in the by-pass lines 112 and 113 prevent the possibility of air flowing from the blowers 110 and 111 of the auxiliary aeration system to the main aeration system blowers 107, although fails to prevent a backflow of the oxygen-containing gas.

The sludge medium is aerated by the oxygen-containing gas dispersers 41 connected by way of the pressure lines 106 to the blowers 107 of the main aeration system, whereby biochemical oxidation of pollutants by microorganisms of the activated sludge takes place in the course of aeration and the travel of the mixture of waste water and activated sludge through the vessel 1 of the primary purification stage.

In the sludge separator 49 whereto biochemically clarified waste water intended for between 15 and 20 min settling time is delivered through the damping baffle 47 and spillway 48, most of the activated sludge is accumulated in the sludge hoppers 93 wherefrom it is transferred to the sludge-removal troughs 94 and 95 and thereafter to the central tubes 98 and 99 of the main and auxiliary sludge compactors 66 and 91, respectively, through the overflow pipes 100 and 101.

From the tapered bottoms 96 and 97 of the sludge compactors 66 and 91 where it takes the activated sludge about 1 to 1.5 hrs to thicken, this sludge is conveyed by the airlifts 102 and 103 of recyclable sludge of increased concentration to the main and auxiliary regeneration chambers 61 and 79. Therewith, compaction of activated sludge requires only between one half and one third the working volumes used in the conventional prior art layouts employing secondary settling tanks. Further, the mutual arrangement of the sludge separator 49 and sludge compactors 66 and 91 ensures reduced amounts of power consumable for feeding recyclable sludge, whereas a dual contact of the recyclable sludge with oxygen of the air during its transfer by the airlifts prevents anaerobic conditions and promotes sludge compaction.

The clarified liquid containing activated sludge in the amount of 10 to 20% from its initial concentration is directed to the second purification stage vessel 52, 53 whereto there is also fed sludge water from the peripheral troughs 104 and 105 of the main and auxiliary sludge compactors 66 and 91, respectively. A process of complete biochemical oxidation of residual pollutants takes place in the vessel 52, 53 of the second stage, this being accompanied by improvement in the sedimentation capacity of the activated sludge thanks to a bubbling effect attained by the dispersers 54 and 55 connected by the pressure lines 106 to the air blower 107 of the main or basic aeration system.

The coagulated suspension and the purified sewage water are conveyed through the outlet port 128 to the secondary purification stage wherein under conditions of reduced concentration of the activated sludge (viz., between 0.5 and 1.5 g/l) eventual oxidation of the residual contaminants, separation of the activated sludge, and removal of excess sludge from the system takes place.

In these operating conditions of the aeration tank, that is under process loads not exceeding 2000 g BOD/m$^3$ per day, the concentration of activated sludge ranges between 1.5 and 2.5 g/l at the concentration of recyclable sludge from 6 to 7 g/l.

The regeneration chambers 61 and 79 are charged with the activated sludge separated in the sludge separator 49 and having a concentration of 4 to 6 g/l and additionally compacted in the sludge compactors 66 and 91 activated sludge of 8 to 10 g/l in concentration, this additionally compacted sludge making between 0.2 and 0.8 parts of the sludge recyclable from the sludge separator. The ratio between sludge flows helps maintain a concentration of activated sludge in the regeneration chambers of 6 to 10 g/l in the regeneration chambers 61 and 79, and from 1.5 to 2.5 g/l in the system.

During high inflow 3 of waste water to the aeration tank, when process loads amount to 5000 g BOD/m$^3$ per day, the butterfly valve 43 assumes one of its extreme positions. A continuous flow of waste water is delivered through some of the open central holes 44 to the vessel 40 of the first purification stage, whereas a major part of waste water enters through the end face hole 45 or 46 to the main or auxiliary prechamber 71 or 87, respectively. Because the head pressure of the waste water at some of the central holes 44 grows, the flow rate of waste water passing therethrough remains invariable, equal to the amount of water discharged per unit time through all the central holes 44 at a minimum level of waste water in the distribution trough 42.

For operation under these conditions the blowers 110 or 111 of the auxiliary aeration system are actuated, these blowers being connected by pressure lines 106 to the dispersers 72 or 90 of oxygen-containing gas of the main or auxiliary prechamber 71 or 87.

Due to an increased counterpressure in the system of pipes on the side of the auxiliary aeration system one of the non-return valves 114 or 115 in the corresponding by-pass 112 or 113 is brought into action to result in separation of air flows of the main and auxiliary aeration systems. By virtue of feeding oxygen-containing gas through the dispersers 72 or 90 of one of the prechambers 71 or 87 the liquid tends to move in an upward direction and the mixture of regenerated sludge and waste water ascends through respective bypasses 64 or 88 from the main or auxiliary regeneration chamber 61 or 79 to the spillways 65 or 89 to enter the vessel 40 of the primary purification stage. A predetermined amount of sludge medium bypassing the damping baffle 47 and overflow wall 48 of the sludge separator 49 is conveyed for clarification, whereas the recirculation flow of sludge medium exceeding 3 to 5 times the predetermined or working flow is delivered through one of the circulation passages 73 or 127 to the corresponding main or auxiliary regeneration chamber 61 or 79.

In order to minimize the amount of power required for initiating a controllable recirculation flow of sludge medium when the liquid ascends in the prechamber 71 or 87 0.1 to 0.5 m above the working level of the primary purification stage vessel 40, the latter and the regeneration chambers 61 or 78 operate by the principle of communicating vessels. The transfer of a required amount of sludge medium from the regeneration chamber 61 or 79 to the vessel 40 of the primary purification stage through the respective prechamber 71 or 87 provides for return of an equal amount of liquid from the end of the vessel 40 to the starting zone of the regeneration chamber 61 or 79 to result in the formation of a recirculation flow of sludge mixture 3 to 5 times exceeding the flow rate of waste water having a concentration of activated sludge therein of 4.5 to 5 g/l in which biochemical oxidation of organic matter is envigorated.

For increasing the degree to which oxygen is utilized during operation of one of the prechambers 71 or 87 to between 8 and 10% (i.e., by half), part of the waste water flow, particularly amounting to between one third and one sixth of the total flow, is delivered directly to the prechamber bypassing the vessel 40.

No excess activated sludge is removed when operating under these conditions, whereas the activated sludge separated in the secondary purification stage and having a concentration of 8 to 12 g/l and in the amount of 0.1 to 0.2 the total flow rate of waste water is additionally conveyed along one of the compacted sludge by-pass troughs 122 or 124 through the inlets 74 or 124 to the starting zone the main or auxiliary regeneration chambers 61 or 79, respectively. Therewith, the working concentration of the activated sludge in the "first purification stage vessel—regeneration chamber" system amounts to 4.5-5 g/l, which ensures an optimum ratio between the biomass and nutrient substrate at increased inflow of waste water. Biochemical oxidation in the flow being aerated and having a concentration of activated sludge from 4.5 to 5 g/l proceeds more vigorously thanks to a temporary reduction in the size of sludge flakes, more uniformly distributed process demand imposed on the sludge in terms of the flow length, and improved utilization of oxygen of the air in the prechamber in which most of the initial pollutants carried by the waste water are withdrawn from the water.

The regulated recirculation of sludge mixture from the end zone of the primary purification stage vessel to its starting zone is a most technically feasible technique for controlling biochemical processes in aeration tanks providing for not only hydraulic, but also "biological" dilution of the incoming waste water with fresh activated sludge.

During a subsequent increase in the process load attaining one that is 4 to 5 times above the average, the butterfly valve 43 again returns to its intermediate position, waste water is delivered at a continuous rate through the central hole 40 of the first purification stage, and most of the liquid mass distributes uniformly between the two prechambers 71 and 87.

Actuation of the non-return valves 114 and 115 and operation of the prechambers 71 and 87 are substantially similar to what has been previously described. A required or working amount of sludge mixture is directed for clarification, whereas a recirculation flow of sludge mixture exceeding the working one 6 to 10 times is conveyed through the circulation passages 73 and 127 to the main and auxiliary regeneration chambers 61 and 79. Therewith, two aerated annular flows are formed in the "vessel 40 of the first purification stage/prechambers 71 and 87" system, the conditions of vigorous biochemical oxidation of organic contaminants being maintained.

The use of sludge mixture recirculation in the proposed aeration tank makes it possible to drastically reduce tank space suffering from dissolved oxygen deficiency, while controlling the amount of dissolved oxygen in the starting, most loaded portions of the aeration tank. This enables to make the intensity of the basic aeration less vigorous and determine it proceeding from the conditions of minimum process loads in the starting portion of the aeration tank and maintaining the activated sludge in a suspended state, that is aim at ensuring homogeneity of the sludge mixture in terms of the height of the aeration tank. During an increase in the process load added amounts of oxygen are introduced by the recirculating mixture, the amount of oxygen thus introduced being controlled by varying the number of operating prechambers. Because the process load is determined by the concentration of pollutants at the initial portion of the waste water treatment facilities, the recirculation acting to reduce such a load, additional aeration can be less vigorous than in conventional aeration tanks. An increase in the number of operating prechambers results in reduction of time spells during which aeration is most vigorous. In consequence, this requires less oxygen-comtaining gas to be fed for aeration.

In order to increase the utilization of oxygen during operation of two prechambers to 11-15%, or make oxygen utilization twice as efficient, part of waste water flow, particularly two thirds of the total flow, is delivered directly to the prechamber.

Operation of the system under these conditions involves conveying the activated sludge separated in the secondary purification stage along the by-pass troughs 122 and 123 to the two regeneration chambers 61 and 79 in the amount of between 0.2 and 0.3 of the total flow of waste water having a concentration of from 8 to 12 g/l. Therewith, the working concentration of activated sludge averaged in the "first purification stage vessel—main regeneration chamber" and "first purification stage vessel—auxiliary regeneration chamber" system amounts to 5.5-6.5 g/l, which provides for maintaining an optimum relationship between the biomass and nutrient substrate at peak process loads.

In instances when the load goes beyond its peak value, excess waste water is conveyed through the overfall walls 118 and 119 to the by-pass troughs 116 and 117 and further through the inlet ports 120 and 121 to the sections of the regeneration chambers most removed from the prechambers 71 and 87. This technique makes it possible to maintain the degree to which waste water is purified without extra expenditures thanks to extending the length of travel of the waste water.

Major difficulties associated with attaining optimum conditions for carrying out the biochemical process of waste water purification in a conventional aeration tank are caused by considerable fluctuations of process loads affecting the continuity in the most favourable ratio between the concentration of pollutants in the incoming waste water, activated sludge and dissolved oxygen.

This disadvantage is obviated in the proposed aeration tank for biotreatment of waste water, which affords to more fully use the capacity of activated sludge to oxidize at practically any fluctuations in the process loads.

Figure 10:
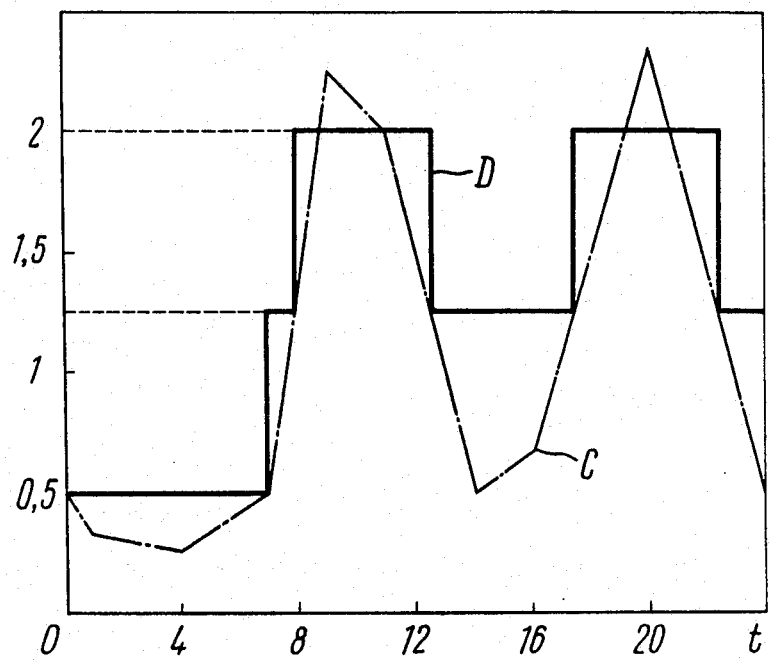
FIG. 10 is a diagram of variation in the amount of oxygen introduced in terms of the time of day as a result of operation of the main and auxiliary prechambers.

With reference to FIG. 10, there is shown a stepped diagram illustrating variations in the process load in terms of time of day (curve C) in combination with a diagram of operation of the main and auxiliary aeration systems (broken curve D). Plotted on the ordinate are BOD loads and amounts of oxygen introduced expressed in relative units.

The lower level of the broken line D corresponds to the operating conditions of the main aeration system; the medium level of the line D corresponds to the period when the waste water inflow increases and when the main prechamber is brought in operation; the upper level of the line D corresponds to the period of peak load when the auxiliary prechamber is brought in operation.

The more accurately the stepped diagram of the controllable variations in the oxidation capacity of the aeration tank "registers" with the diagram of load fluctuations, the less are unproductive expenditures of electric power and the more technologically and economically advantageous is the waste water purification system. The advantage is attained by varying the number and capacity of operating prechambers.

It is advisable that in addition to the main prechamber the auxiliary prechamber be brought in operation during peak loads. The prechambers are actuated, for example, by the readings of a level gauge secured in the waste water distribution trough, the operation of the prechambers being corrected by the readings of dissolved oxygen pick-ups provided in crucial points of the primary purification stage vessel.

What is claimed is:

1. A method of biological purification of waste water by removing organic impurities therefrom by activated sludge in two successive stages, the first stage having a starting and an end zone said method comprising the steps of:

mixing in the starting zone, incoming waste water with activated sludge to obtain a sludge medium;

aerating the thus obtained sludge medium during passage from the starting zone to the end zone;

separating recyclable sludge and sludge water from said sludge medium in the end zone of the primary purification stage;

dividing said separated recyclable sludge into two portions of which the first portion is conveyed for regeneration;

compacting the second portion of recyclable sludge to increase its concentration;

mixing the second portion of recyclable sludge after compaction with the first portion of recyclable sludge conveyed for regeneration in a regeneration zone;

regenerating said mixed first and second portions of recyclable sludge to obtain regenerated activated sludge;

feeding the regenerated activated sludge to said starting zone of the primary purification stage for mixing with the incoming waste water being purified while maintaining in said primary purification stage a continuity in the ratio between organic impurities brought in by the incoming waste water and activated sludge; and conveying sludge water separated in the primary purification stage to the secondary purification stage;

the secondary purification stage comprising the steps of:

aerating sludge water conveyed to the secondary purification stage; and separating residual activated sludge therefrom.

2. A method as defined in claim 1, in which said second portion of recyclable sludge subjected to compaction comprises from 0.2 to 0.8 of the total mass of recyclable sludge conveyed for regeneration.

3. A method as defined in claim 1, in which during a higher inflow of waste water a portion of the flow of waste water to be purified is mixed with said regenerated activated sludge in said regeneration zone, subjected to additional aeration by contact with an oxygen-containing gas and mixed with the waste water in the starting zone;

the thus obtained sludge medium is then mixed with the waste water delivered to said starting zone of the primary purification stage; and subsequent to treatment in the primary purification stage part of the flow of sludge medium of said end zone of the primary purification stage is directed back to said starting zone of the primary purification stage, mixing it with said recycled sludge conveyed for regeneration, the oxygen-containing gas intended for additional aeration being fed in an amount sufficient for vigorous longitudinal mixing of said sludge medium of the primary purification stage by recirculating the flow of said sludge medium between said starting and end zones of the primary purification stage.

4. A method as defined in claim 3, in which oxygen-containing gas intended for additional aeration is fed in the amount providing for a ratio between the recirculation flow of sludge medium and the incoming sludge water delivered for purification within a range of from 3 to 10.

5. A method as defined in claim 4, in which substantially between one third and two thirds of the incoming flow of waste water delivered for purification is fed for preliminary mixing with regenerated sludge in the regeneration zone.

6. A method as defined in claim 1, in which sludge water formed as a result of compaction of the second portion of recyclable sludge conveyed for regeneration is admitted to the secondary purification stage and subjected to aeration, whereas activated sludge separated in the secondary purification stage is fed for mixing with the recyclable sludge conveyed for regeneration.

* * * * *